US006308255B1

(12) United States Patent
Gorishek, IV et al.

(10) Patent No.: US 6,308,255 B1
(45) Date of Patent: Oct. 23, 2001

(54) SYMMETRICAL MULTIPROCESSING BUS AND CHIPSET USED FOR COPROCESSOR SUPPORT ALLOWING NON-NATIVE CODE TO RUN IN A SYSTEM

(75) Inventors: Frank J. Gorishek, IV; Charles R. Boswell, Jr., both of Austin; David W. Smith, Cedar Park, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/085,188

(22) Filed: May 26, 1998

(51) Int. Cl.$^7$ ................................. G06F 9/455; G06F 9/44

(52) U.S. Cl. ..................... 712/209; 712/227; 710/102; 710/103; 710/104; 710/62; 710/8; 710/129; 710/126

(58) Field of Search .................. 712/1, 28, 32, 712/23, 33, 24, 34, 35, 41, 43, 209, 227, 229, 38; 709/213, 229, 250; 710/1, 2, 62, 72, 101, 102, 240; 711/146; 703/26, 27; 717/5

(56) References Cited

U.S. PATENT DOCUMENTS

| 4,799,150 | 1/1989 | Bui ....................................... 710/130 |
| 4,954,949 | * 9/1990 | Rubin .................................. 710/101 |

(List continued on next page.)

FOREIGN PATENT DOCUMENTS

| 0 230 353 | 7/1987 | (EP) . |
| 0 455 345 | 11/1991 | (EP) . |

(List continued on next page.)

OTHER PUBLICATIONS

BYTE Magazine, "Why the 615 Matters", Linley Gwennap, 1995, pp. 198–200.
BYTE Magazine, "An Alpha in PC Clothing", Tom Thompson, Feb. 1996, pp. 1–6.

(List continued on next page.)

Primary Examiner—Daniel H. Pan
(74) Attorney, Agent, or Firm—Conley, Rose & Tayon, PC; Lawrence J. Merkel

(57) ABSTRACT

A computer system includes a host processor and an emulation coprocessor. The host processor includes hardware configured to execute instructions defined by a host instruction set architecture, while the emulation coprocessor includes hardware configured to execute instructions defined by a different instruction set architecture from the host instruction set architecture ("the foreign instruction set architecture"). According to one embodiment, the host processor executes operating system code as well as application programs which are coded in the host instruction set architecture. Upon initiation of a foreign application program, the host processor communicates with the emulation coprocessor to cause the emulation coprocessor to execute the foreign application program. The computer system also includes a bus bridge coupled to the host processor and the emulation coprocessor. The bus bridge provides access to main memory both for the host processor and the emulation coprocessor, and provides for coherency between the host processor and emulation coprocessor. Preferably in one particular embodiment, the bus bridge may be a bus bridge designed for a symmetric multiprocessing system including multiple host processors. By providing an emulation coprocessor having a bus interface which is electrically and logically identical to the bus interface provided by the host processor, the emulation coprocessor may be inserted into a processor slot within a symmetric multiprocessing system to form a computer system which employs high performance hardware support for a foreign instruction set architecture. The host processor may control the emulation coprocessor via software, allowing the coprocessor system to be realized without additional hardware.

15 Claims, 10 Drawing Sheets

U.S. PATENT DOCUMENTS

| | | | |
|---|---|---|---|
| 5,077,657 | 12/1991 | Cooper et al. | 395/500 |
| 5,574,927 | 11/1996 | Scantlin | 712/41 |
| 5,638,525 | 6/1997 | Hammond et al. | 712/209 |
| 5,659,709 | 8/1997 | Quach | 711/146 |
| 5,666,519 | 9/1997 | Hayden | 712/233 |
| 5,717,898 * | 2/1998 | Kagan et al. | 711/145 |
| 5,764,934 * | 6/1998 | Fisch et al. | 710/129 |
| 5,802,373 | 9/1998 | Yates et al. | 717/5 |
| 5,802,577 * | 6/1999 | Bhat et al. | 711/146 |
| 5,819,105 * | 10/1998 | Moriarty et al. | 395/825 |
| 5,909,559 * | 6/1999 | So | 395/307 |
| 5,923,892 * | 7/1999 | Levy | 712/31 |
| 5,925,123 * | 7/1999 | Tremblay et al. | 712/212 |

FOREIGN PATENT DOCUMENTS

| | | |
|---|---|---|
| 0 617 376 | 9/1994 | (EP) . |
| 0 671 685 A2 | 2/1995 | (EP) . |
| 0 817 096 | 1/1998 | (EP) . |
| 2 278 214 | 11/1994 | (GB) . |

OTHER PUBLICATIONS

BYTE Magazine, "Alpha Learns to do Windows", Selinda Chiquoine, Oct. 1996, pp. 1–3.

Microsoft Windows NT Workstation, "Windows (r) x86 Technology Preview", Microsoft Corporation, 1997, pp. 1.

AMD, "Amd–K6 Processor Data Sheet", Chpts. 1 & 2, Mar. 1998, pp. 1–20.

Digital Equipment Corp., Maynard Massachusetts, "Digital Semiconductor 21172 Core Logic Chipset", Technical Reference Manual, Apr. 1996, pp. 1–1 to 1–7.

Readwx86, "Win32 x86 Emulation on Risc (Wx86)", pp. 2.

AMD Tech Law, "Intel Reveals How Merced Will be x86 –Compatible", Alexander Wolfe, Santa Clara, CA, May 8, 1998, pp. 2.

AMD, "AMD5K 86TM Processor", Technical Reference Manual, Chpts. 1 & 2, pp. 1–1 to 1–3 and 2–1 to 2–12.

"Press Release", Updated: Jun. 25, 1997, downloaded from:www.digital.com/info/PR00UM and www.zdnet.com/cshopper/content/9704/cshp0039.html on Dec. 11, 1997, (7 sheets).

Digital, "Digital FX!32", Updated Sep. 26, 1997, downloaded from www.digital.com/semiconductor/amt/fx32/fx- –white.html on Jan. 26, 1998, pp. 1–4.

Orange Micro, Inc., "Product Information", downloaded from www.orangemicro.com.page2.html on Aug. 4, 1998, (6 sheets).

International Search Report for Application No. PCT/US99/01457 mailed Jun. 14, 1999.

* cited by examiner

| Command | Function |
|---|---|
| Read Registers | Read One or More Emulation Coprocessor Registers |
| Write Registers | Write One or More Emulation Coprocessor Registers |
| Go | Begin Execution at Execution Pointer Stored in Program Counter |
| Stop | Inform Host that Emulation Coprocessor Has Stopped (Includes Reason for Stopping) |

SYMMETRICAL MULTIPROCESSING BUS AND CHIPSET USED FOR COPROCESSOR SUPPORT ALLOWING NON-NATIVE CODE TO RUN IN A SYSTEM

BACKGROUND OF THE INVENTION

1. Field of the Invention

This invention is related to the field of computer systems and, more particularly, to computer systems configured to provide compatibility with previous instruction set architectures.

2. Description of the Related Art

Computer systems have become an important productivity tool in many environments. Nearly all lines of work benefit from a computer system to carry out many tasks which are central to that work. For example, managerial professionals use computer systems for managing data bases of business-critical data, creating and managing documents, etc. Engineering professionals use computer systems for researching, designing, and verifying products. Manufacturing and distribution centers use computer systems to control manufacturing machines, to track products through the manufacturing process, for inventory control, and to manage distribution products to wholesale/retail centers. All of the above may use computer systems for communications as well via email, the Internet, intranets, etc. Home uses for computer systems abound as well, including financial management, communication, and entertainment. Many other uses for computer systems exist.

As the above illustrates, a large and diverse set of uses for computer systems have been developed. Generally, these uses are supported by a variety of application programs designed to execute under an operating system provided for the computer system. The operating system provides an interface between the application programs and the computer system hardware. Each computer system may have a variety of differences in hardware configuration (e.g. amount of memory, number and type of input/output (I/O) devices, etc.). The operating system insulates the application program from the hardware differences. Accordingly, the application program may often times be designed without regard for the exact hardware configuration upon which the application program is to execute. Additionally, the operating system provides a variety of low level services which many different types of application programs may need, allowing the application programs to rely on the operating system services instead of programming these services internal to the application program. Generally, the operating system provides scheduling of tasks (e.g. different application programs which may be operating concurrently), management and allocation of system resources such as I/O devices and memory, error handling (e.g. an application program operating erroneously), etc. Examples of operating systems are the Windows operating system (including Windows 95 and Windows NT), UNIX, DOS, and MAC-OS, among others. Conversely, an application program provides specific user functionality to accomplish a specific user task. Word processors, spreadsheets, graphics design programs, inventory management programs, etc. are examples of application programs.

Therefore, application programs are typically designed to operate upon a particular operating system. The services available from the operating system ("operating system routines") are optionally used by the application program. Additionally, the application program conforms to the requirements of the operating system.

One hardware feature which the operating system does not typically insulate the application program from is the instruction set architecture of the processors within the computer system. Generally, an instruction set architecture defines the instructions which execute upon the processors, as well as processor resources directly used by the instructions (such as registers, etc.). The application program (and the operating system) are generally compiled into a set of instructions defined by the instruction set architecture, and hence the operating system does not insulate the application program from this feature of the computer system hardware.

As described above, a computer system must support a large number of different types of application programs to be useful to a large base of customers. Processors employing newly developed instruction set architectures face a daunting task of enticing application developers to develop applications designed for the new instruction set architecture. However, without the application programs, the instruction set architecture and the processors designed therefor will often achieve only limited market acceptance, at best.

It is difficult and time consuming to recreate application programs using the new instruction set architecture due to the large number of application programs and the time and effort needed to "port" each application program to the new instruction set architecture. Furthermore, the source code for many application programs may be unavailable to those desiring to perform the port. On the other hand, operating systems are fewer in number (particularly those with widespread acceptance) and may be ported to a variety of instruction set architectures. For example, Windows NT has supported the Alpha architecture developed by Digital Equipment Corporation, the PowerPC architecture developed by IBM and Motorola, and the MIPS architecture, in addition to the x86 architecture.

In order to provide a large applications base, thereby generating market acceptance which may lead to more application programs being developed, a computer system based on processors employing the newly developed instruction set architecture may attempt to support applications coded to a different instruction set architecture. Herein, code using instructions defined by the instruction set architecture employed by the processors in a computer system is referred to as "native" or "host". while code using instructions defined by a different instruction set architecture is referred to as "non-native" or "foreign".

The x86 architecture (also referred to as IA-32 or APX) has one of the largest application program bases in the history of computing. A large percentage of these programs are developed to run under the Windows operating system. While Windows and the x86 application programs are used periodically as an example herein, the techniques and hardware disclosed herein are not limited to this instruction set architecture and operating system. Any operating system and instruction set architecture may be used.

New computer systems, whose host processor is non-x86, may provide support for x86 (i.e. foreign) application programs running under the Windows operating system while application programs are developed for the non-x86 host processor. Two methods which have been used to support foreign applications in a computer system are software emulation and binary translation. Software emulation generally comprises reading each instruction in the application program as the instruction is selected for execution and performing an equivalent instruction sequence in the host architecture. Binary translation generally involves translating each instruction in the application program into an equivalent instruction sequence prior to executing the program, and then executing the translated program sequence.

Unfortunately, because each foreign instruction is examined during execution of the program, software emulation provides significantly reduced performance of the application program than that achievable on a computer system employing the foreign instruction set architecture. Furthermore, more memory is required to execute the application program, in order to store the emulation program and supporting data structures. If the application program includes real time features (e.g. audio and video), these features may operate poorly because of the excessive execution time. Still further, processor implementations of an instruction set architecture often include a variety of undocumented features (both known and unknown) which must be modeled by the software emulator. Furthermore, complex hardware features (such as the x86 floating point register stack) are difficult to model accurately in the software emulator.

Binary translation suffers from several drawbacks as well. Binary translation is not transparent to the user. Binary translation often requires multiple passes through the application program code to successfully translate the program. In the interim, software emulation may be used to execute the application (with many of the aforementioned drawbacks). Sometimes, a complete translation is not achieved, and hence software emulation is still required.

Several combinations of the above approaches have been employed by computer system companies and operating system companies. For example, Digital Equipment Corporation offers its FX!32 system and Microsoft offers its Wx86 extension to Windows NT. However, while these approaches have provided functionality, the high performance desired of the foreign applications has generally not been satisfied.

SUMMARY OF THE INVENTION

The problems outlined above are in large part solved by a computer system in accordance with the present invention. The computer system includes a host processor and an emulation coprocessor coupled to a bus bridge in a manner substantially the same as the coupling of multiple host processors in a symmetric multiprocessing (SMP) system. SMP computer system hardware may be used to support memory access and coherency mechanisms within the computer system, although the computer system is configured to perform coprocessing of foreign application programs under the host operating system.

The host processor includes hardware configured to execute instructions defined by a host instruction set architecture, while the emulation coprocessor includes hardware configured to execute instructions defined by a different instruction set architecture from the host instruction set architecture ("the foreign instruction set architecture"). According to one embodiment, the host processor executes operating system code as well as application programs which are coded in the host instruction set architecture. Upon initiation of a foreign application program, the host processor communicates with the emulation coprocessor to cause the emulation coprocessor to execute the foreign application program. The computer system also includes a bus bridge coupled to the host processor and the emulation coprocessor. The bus bridge provides access to main memory both for the host processor and the emulation coprocessor. Additionally, the bus bridge, host processor, and emulation coprocessor participate in maintaining memory coherency between the host processor, the emulation coprocessor, and the main memory.

Advantageously, application programs coded according to the foreign instruction set architecture can be executed directly in hardware via the emulation coprocessor. Additionally, since the emulation coprocessor is coupled to the bus bridge (and hence to the main memory) in a manner substantially the same as an SMP processor connection, high speed memory access may be achieved by the emulation coprocessor. Furthermore, the combination of the bus bridge, the host processor, and the emulation coprocessor may be configured to maintain memory coherency similar to coherency mechanisms used in symmetrical multiprocessing systems. Execution performance of the application program may be substantially greater than that of a software emulation or binary translation methodology. Moreover, execution performance may be substantially similar to execution performance of the application program within a computer system based upon a processor employing the foreign instruction set architecture. Software emulation/binary translation methodologies and combinations thereof may be eliminated in favor of hardware execution of the foreign application program. Because the emulation coprocessor includes hardware functionality for executing the foreign instruction set architecture, the difficulties of accurate architecture modeling may be eliminated. Furthermore, since the foreign application program executes in a period of time similar to execution in a native computer system, much of the real-time behavior of the foreign application program may be preserved. The combination of these various advantages may provide a high level of performance, allowing the foreign application execution performance to be highly acceptable to a user. Accordingly, market acceptance of the computer system based upon the host instruction set architecture may be increased. As market acceptance increases, the number of application programs coded for the host instruction set architecture may increase as well. Long-term success and viability of the host instruction set architecture may therefore be more likely.

Preferably in one particular embodiment, the bus bridge may be a bus bridge designed for a symmetric multiprocessing system including multiple host processors. By providing an emulation coprocessor having a bus interface which is electrically and logically identical to the bus interface provided by the host processor, the emulation coprocessor may be inserted into a processor slot within a symmetric multiprocessing system to form a computer system which employs high performance hardware support for a foreign instruction set architecture. The host processor may control the emulation coprocessor via software, allowing the coprocessor system to be realized without additional hardware.

Broadly speaking, the present invention contemplates a computer system, comprising a first processor, a second processor, a memory, and a bus bridge. The first processor is configured to execute first instructions defined by a first instruction set architecture. Similarly, the second processor is configured to execute second instructions defined by a second instruction set architecture different from the first instruction set architecture The bus bridge is coupled to the first processor, the second processor, and the memory, and is configured to provide access to the memory by the first processor and the second processor. Additionally, the bus bridge is configured to maintain coherency between the first processor and the second processor.

The present invention further contemplates a method for providing execution capability in a computer system. A computer system is provided having at least two electrically and logically identical processor slots. A first processor configured to execute first instructions defined by a first instruction set architecture is inserted into one of the at least two processor slots. A second processor is inserted into another one of the at least two processor slots. The second processor is configured to execute second instructions defined by a second instruction set architecture different than the first instruction set architecture.

BRIEF DESCRIPTION OF THE DRAWINGS

Other objects and advantages of the invention will become apparent upon reading the following detailed description and upon reference to the accompanying drawings in which:

FIG. 8 is a table illustrating a set of coprocessor commands which may be used in a command interface shown in FIGS. 1 and 2.

Figure 1:
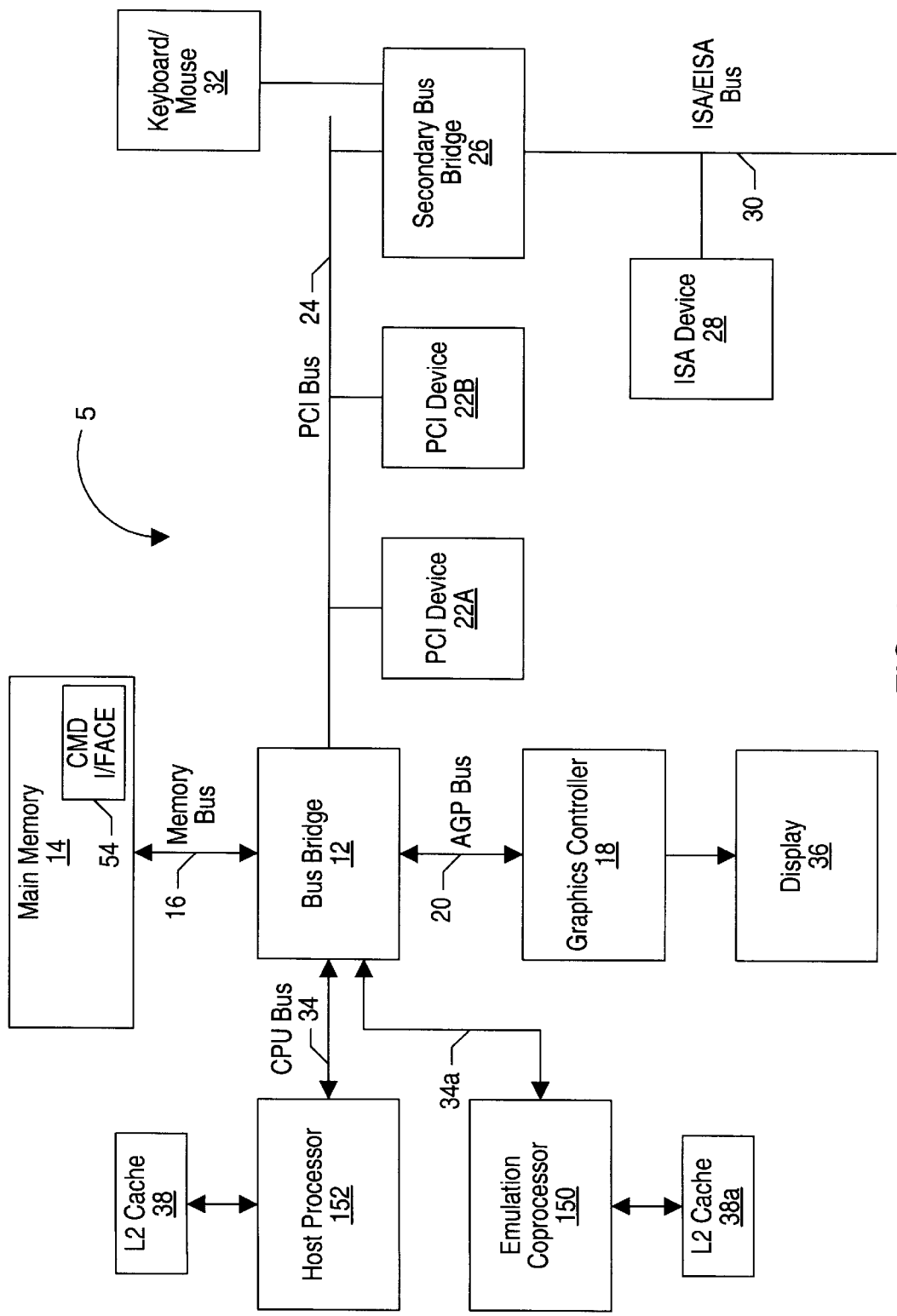
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system 5 including a host processor 152 and an emulation coprocessor 150 coupled to a variety of system components through a bus bridge 12 is shown. Other embodiments are possible and contemplated. In the depicted system, a main memory 14 is coupled to bus bridge 12 through a memory bus 16, and a graphics controller 18 is coupled to bus bridge 12 through an AGP bus 20. Finally, a plurality of PCI devices 22A–22B are coupled to bus bridge 12 through a PCI bus 24. A secondary bus bridge 26 may further be provided to accommodate an electrical interface to one or more EISA or ISA devices 28 through an EISA/ISA bus 30. Host processor 152 is coupled to bus bridge 12 through a CPU bus 34, and emulation coprocessor 150 is coupled to bus bridge 12 through a CPU bus 34a.

Generally speaking, computer system 5 includes a host processor 152 and an emulation coprocessor 150. The computer system includes a host processor and an emulation coprocessor coupled to a bus bridge in a manner substantially the same as the coupling of multiple host processors in a symmetric multiprocessing (SMP) system. SMP computer system hardware may be used to support memory access and coherency mechanisms within the computer system, although the computer system is configured to perform coprocessing of foreign application programs under the host operating system. Host processor 152 comprises hardware configured to execute instructions defined by a host instruction set architecture, while emulation coprocessor 150 comprises hardware configured to execute instructions defined by a different instruction set architecture from the host instruction set architecture ("the foreign instruction set architecture"). According to one embodiment, host processor 152 executes operating system code as well as application programs which are coded in the host instruction set architecture. Upon initiation of a foreign application program, host processor 152 communicates with emulation coprocessor 150 to cause emulation coprocessor 150 to execute the foreign application program.

Advantageously, application programs coded according to the foreign instruction set architecture can be executed directly in hardware via emulation coprocessor 150. Additionally, since emulation coprocessor 150 is coupled (via CPU bus 34a) to bus bridge 12 (and hence to main memory 14), high speed memory access may be achieved by emulation coprocessor 150 (e.g. comparable to the speed at which memory is accessible by host processor 152). Furthermore, bus bridge 12 may be configured to maintain coherency between host processor 152 and emulation coprocessor 150 similar to coherency mechanisms used in symmetrical multiprocessing systems. Execution performance of the application program may be substantially greater than that of a software emulation or binary translation methodology. Moreover, execution performance may be substantially similar to execution performance of the application program within a computer system based upon a processor employing the foreign instruction set architecture. Software emulation/binary translation methodologies and combinations thereof may be eliminated in favor of hardware execution of the foreign application program. Because emulation coprocessor 150 includes hardware functionality for executing the foreign instruction set architecture, the difficulties of accurate architecture modeling may be eliminated. Furthermore, since the foreign application program executes in a period of time similar to execution in a native computer system, much of the real-time behavior of the foreign application program may be preserved. The combination of these various advantages may provide a high level of performance, allowing the foreign application performance to be highly acceptable to a user. Accordingly, market acceptance of the computer system based upon the host instruction set architecture may be increased. As market acceptance increases, the number of application programs coded for the host instruction set architecture may increase as well. Long-term success and viability of the host instruction set architecture may therefore be more likely.

Preferably, bus bridge 12 may be a bus bridge designed for a symmetric multiprocessing system including multiple host processors similar to host processor 152. By providing an emulation coprocessor 150 having a bus interface which is electrically and logically identical to the bus interface provided by the host processor, emulation coprocessor 150 may be inserted into a processor slot within a symmetric multiprocessing system to form a computer system which employs high performance hardware support for a foreign instruction set architecture. Host processor 152 may control emulation coprocessor 150 via software, allowing the coprocessor system to be realized without additional hardware. For example, coprocessor communication may be provided by a command interface 54 in memory, for example (e.g. command and response queues for host processor 152 and emulation coprocessor 150). Emulation coprocessor 150 may receive commands to execute a particular foreign application, as well as communicate operating system calls, etc. via the command interface.

The term "electrically identical", when referring to a pair of interfaces, means that the signalling technology employed is identical in both interfaces (e.g. TTL levels, GTL, etc.) and the electrical specifications (e.g. setup and hold times) are compatible (i.e. a circuit designed to accommodate the electrical specifications of host processor 152 also accommodates emulation coprocessor 150). The term "logically identical" means that the protocol used by the pair of interfaces is the same (e.g. bus operations of various types are encoded the same way on the pair of interfaces). Furthermore, the term "coherency" refers to ensuring that each processor in computer system 5 has a consistent view of memory with each other processor (i.e. any processor accessing a value in memory receives the same value as any other processor accessing that memory).

Providing hardware functionality for the foreign instruction set architecture within computer system 5 generates additional advantages. In particular, computer system 5 may be characterized as a heterogeneous multiprocessing system. While the emulation coprocessor is executing the foreign application program, the host processor may execute operating system routines unrelated to the foreign application program or may execute a host application program. Advantageously, computer system 5 may achieve a substantially higher throughput on both host and foreign code that would be achievable via a computer system employing only the host processor and software emulation/binary translation for the foreign instruction set architecture.

In one particular embodiment, the host instruction set architecture is the Alpha instruction set architecture developed by Digital Equipment Corporation and the foreign instruction set architecture is the x86 instruction set architecture. However, any instruction set architecture could be chosen as the host instruction set architecture. For example, the host instruction set architecture may be the PowerPC architecture, the IA-64 architecture developed by Intel, the MIPS architecture, the SPARC architecture, etc. Similarly, the foreign instruction set architecture may be chosen is any instruction set architecture other than the host instruction set architecture, including any of the examples listed above.

Host processor 152 is shown in FIG. 1 coupled to an optional L2 cache 38. L2 cache 38 is referred to as a "backside L2", as the cache is coupled to host processor 152 via a private interface separate from CPU bus 34. L2 cache 38 may be larger than any internal caches employed within host processor 152 and may be used to store data for more rapid access than that achievable from main memory 14. Similarly, emulation coprocessor 150 may be coupled to an L2 cache 38a.

As used herein, the term "processor" refers to at least the hardware for executing instructions defined by a particular instruction set architecture.

Bus bridge 12 provides an interface between host processor 152, emulation coprocessor 150, main memory 14, graphics controller 18, and devices attached to PCI bus 24. When an operation is received from one of the devices connected to bus bridge 12, bus bridge 12 identifies the target of the operation (e.g. a particular device or, in the case of PCI bus 24, that the target is on PCI bus 24). Bus bridge 12 routes the operation to the targeted device. Bus bridge 12 generally translates an operation from the protocol used by the source device or bus to the protocol used by the target device or bus. In one embodiment, CPU buses 34 and 34a comprise an EV6 bus developed by Digital Equipment Corporation and bus bridge 12 comprises logic similar to an Alpha 21171 or 21172 core logic chipset along with symmetrical multiprocessing coherency hardware. However, any CPU bus and suitable bus bridge may be used.

Figure 2:
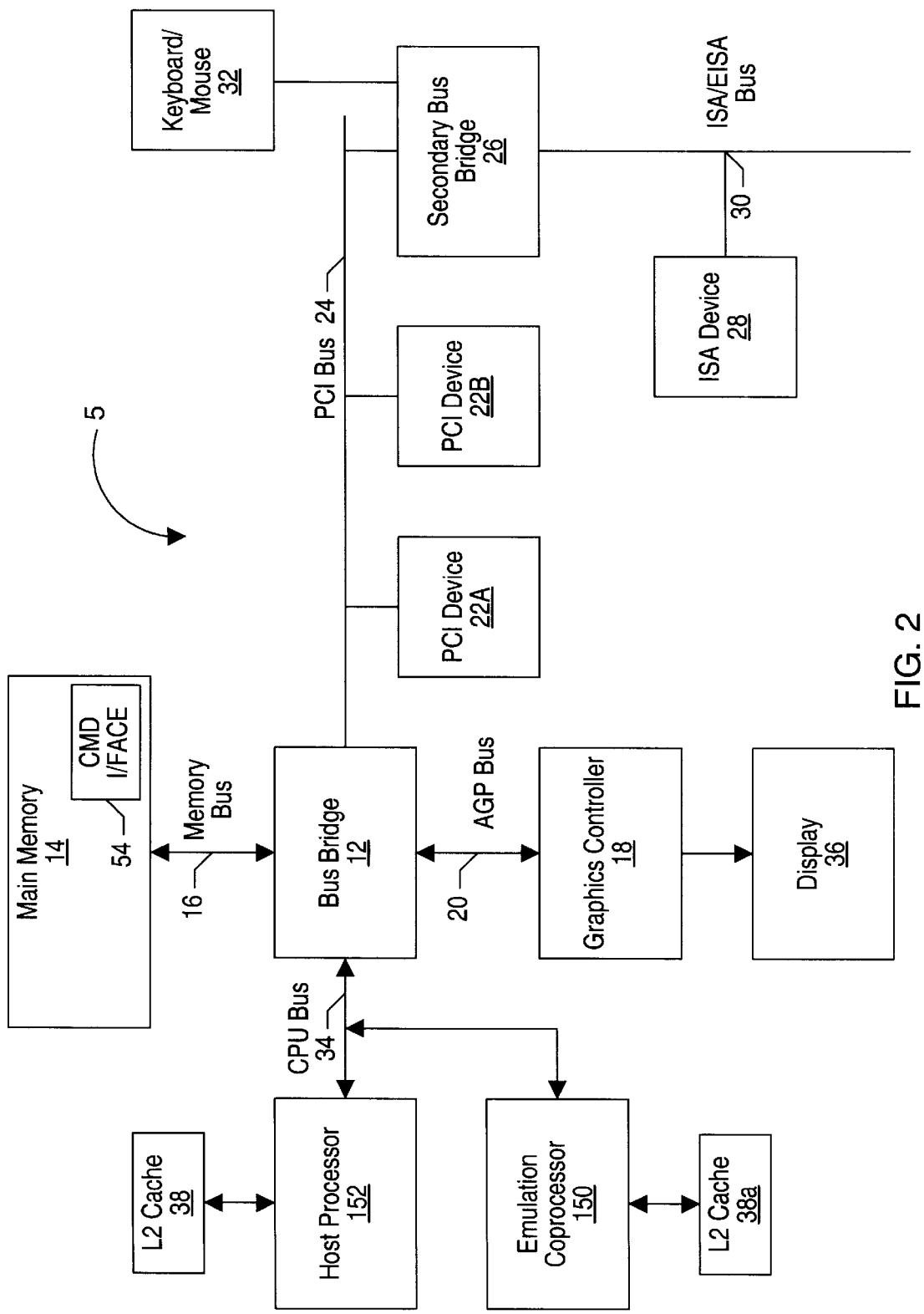
FIG. 2 is a block diagram of another embodiment of a computer system.

Generally, bus bridge 12, host processor 152, and emulation coprocessor 150 may participate in maintaining memory coherency. Memory coherency is maintained if an access to a memory location from any processor receives a consistent value as would be received via access by any other processor to the memory location. Depending upon the bus structure and coherency protocol selected, the level of participation of bus bridge 12, host processor 152, and emulation coprocessor 150 may vary. For example, in the embodiment of FIG. 1, bus bridge 12 may be substantially responsible for determining cache state changes to be performed within the caches of emulation coprocessor 150 and host processor 152 and the source of the data for any given memory operation (i.e. main memory 14 or one of the caches). Emulation coprocessor 150 and host processor 152 may be slaves responding to coherency commands from bus bridge 12 to change cache state and/or provide data. Other embodiments (e.g. FIG. 2 shown below) may place much of the coherency responsibility with the processors. Still further, other embodiments may divide the coherency responsibilities between bus bridge 12 and the processors in any suitable fashion.

In addition to providing an interface to an ISA/EISA bus for PCI bus 24, secondary bus bridge 26 may further incorporate additional functionality, as desired. For example, in one embodiment, secondary bus bridge 26 includes a master PCI arbiter (not shown) for arbitrating ownership of PCI bus 24. An input/output controller (not shown), either external from or integrated with secondary bus bridge 26, may also be included within computer system 5 to provide operational support for a keyboard and mouse 32 and for various serial and parallel ports, as desired. An external cache unit (not shown) may further be coupled to CPU bus 34 between processor 10 and bus bridge 12 in other embodiments. Alternatively, the external cache may be coupled to bus bridge 12 and cache control logic for the external cache may be integrated into bus bridge 12.

Main memory 14 is a memory in which application programs are stored and from which host processor 152 and emulation coprocessor 150 primarily execute. A suitable main memory 14 comprises DRAM (Dynamic Random Access Memory), and preferably a plurality of banks of SDRAM (Synchronous DRAM).

PCI devices 22A–22B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 28 is illustrative of various types of peripheral devices, such as a modem, a sound card, and a variety of data acquisition cards such as GPIB or field bus interface cards.

Graphics controller 18 is provided to control the rendering of text and images on a display 36. Graphics controller 18 may embody a typical graphics accelerator generally known in the art to render three-dimensional data structures which can be effectively shifted into and from main memory 14. Graphics controller 18 may therefore be a master of AGP bus 20 in that it can request and receive access to a target interface within bus bridge 12 to thereby obtain access to main memory 14. A dedicated graphics bus accommodates rapid retrieval of data from main memory 14. For certain operations, graphics controller 18 may further be configured to generate PCI protocol transactions on AGP bus 20. The AGP interface of bus bridge 12 may thus include functionality to support both AGP protocol transactions as well as PCI protocol target and initiator transactions. Display 36 is any electronic display upon which an image or text can be presented. A suitable display 36 includes a cathode ray tube ("CRT"), a liquid crystal display ("LCD"), etc.

It is noted that, while the AGP, PCI, and ISA or EISA buses have been used as examples in the above description, any bus architectures may be substituted as desired. Generally, buses for connection of input/output devices are referred to as "peripheral buses" herein. The PCI, AGP, ISA, and EISA buses may be examples of peripheral buses. Other examples exist as well.

Turning next to FIG. 2, a block diagram of a second embodiment of computer system 5 is shown. Other embodiments are possible and contemplated. In the embodiment of FIG. 2, computer system 5 is generally similar to the embodiment of FIG. 1. However, the embodiment of FIG. 2 illustrates a single CPU bus 34 coupling emulation coprocessor 150 and host processor 152 to bus bridge 12. Accordingly, computer system 5 as shown in FIG. 2 illustrates a computer system employing a shared CPU bus.

Shared CPU bus 34 may employ a coherency protocol as part of the bus protocol. Therefore, bus bridge 12 may not be involved in maintaining coherency between host processor 152 and emulation coprocessor 150 in the embodiment of FIG. 2. Bus bridge 12 may perform operations on CPU bus 34 to maintain coherency between processors 150 and 152 and transfers from (to) I/O devices 22 to (from) main memory 14, as well as coherency between processors 150 and 152 and transfers from (to) graphics controller 18 to (from) main memory 14. Additionally, bus bridge 12 provides access to main memory 14, I/O devices 22, and graphics controller 18 for host processor 152 and emulation coprocessor 150.

It is noted that, while the embodiments illustrated in FIGS. 1 and 2 are shown is having one host processor 152 and one emulation coprocessor 150, other embodiments are contemplated in which multiple host processors 152 are included and in which multiple emulation coprocessors 150 are included. Any combination of one or more host processors and one or more emulation coprocessors may be employed in contemplated computer systems. It is further noted that, while the embodiments of FIGS. 1 and 2 illustrate the command interface between host processor 152 and emulation coprocessor 150 as residing in main memory 14, other embodiments may employ a private interface between emulation coprocessor 150 and host processor 152.

Figure 3:
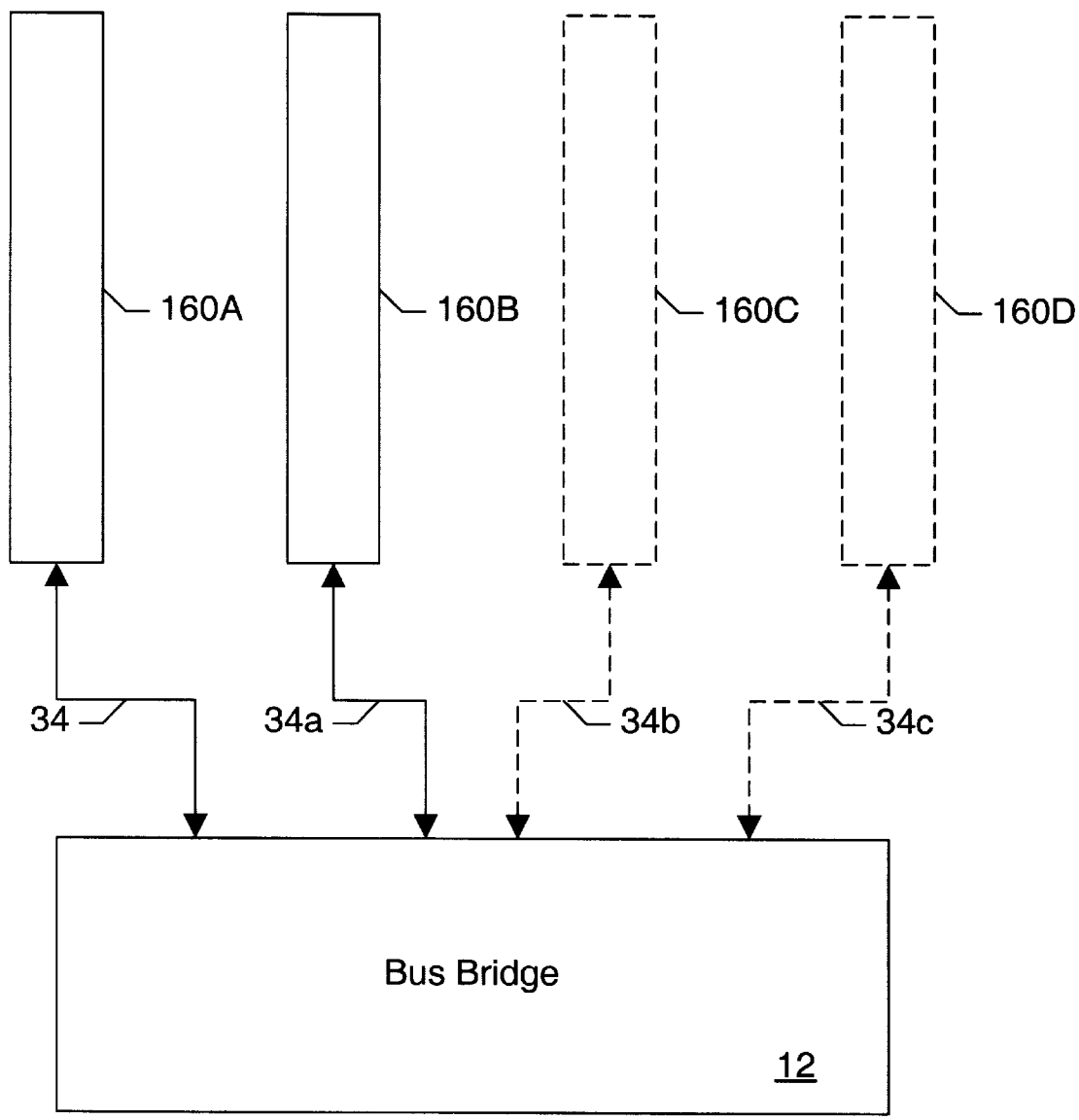
FIG. 3 is a block diagram of one embodiment of a bus bridge shown in FIGS. 1 and 2 coupled to a set of processor slots.

Turning next to FIG. 3, a block diagram illustrating one embodiment of bus bridge 12 coupled to a set of processor slots 160A–160D is shown. Other embodiments are possible in contemplated. Each processor slot 160A–160D is coupled to bus bridge 12 via a separate CPU bus 34, 34a, 34b, and 34c as shown.

Processor slots 160A–160D are physically dimensioned for insertion of a processor conforming to the physical specifications of host processor 152. For example, processor slots 160A–160D may be designed according to the Slot 1 specification developed by Intel Corp. or the Slot A or Slot 2000 specifications developed by Advanced Micro Devices Inc. In the present embodiment, an emulation coprocessor 150 is provided which meets the physical specifications of host processor 152 (in addition to having an interface which is electrically and logically identical to the interface defined by host processor 152 i.e. CPU bus 34). Accordingly, emulation coprocessor 150 may be inserted into any of slots 160A–160D.

A variety of system configurations may be supported by the embodiment shown in FIG. 3. For example, each processor slot may be populated by a host processor, thereby providing a symmetric multiprocessing system. Alternatively, one or more of the processor slots may be populated with emulation coprocessors, with the remaining processor slots populated by host processors. Coprocessor control may be provided in variety of fashions. For example, each host processor may be assigned an emulation coprocessor to control. Alternatively, one host processor may provide coprocessor control for all of the emulation coprocessors, or the emulation coprocessor control may be distributed among host processors (e.g. coprocessor control may be scheduled as a task for the next available host processor to perform).

FIG. 3 further illustrates the modular connection of processors to bus bridge 12 according to one embodiment of bus bridge 12. Each CPU bus connection to bus bridge 12 may be referred to as a "port" on bus bridge 12. As used with respect to bus bridge 12, a port is a connection point for a processor. Generally, bus bridge 12 may assign equal priority to processors attached at each port. Bus bridge 12, in the embodiments of FIGS. 1 and 2, may not be aware of which type of processor (i.e. emulation coprocessor or a host processor) is attached to a particular port. Bus operations received upon a particular port are routed to the corresponding destination (e.g. main memory 14, AGP bus 20, or PCI bus 24). Additionally, if a bus operation is defined to be coherent according to the protocol of CPU bus 34, a snoop cycle may be generated upon the remaining ports.

As illustrated by the dotted enclosures representing slots 160C–160D and the corresponding dotted connections representing CPU bus 34b and CPU bus 34c, these ports on bus bridge 12 are optional for realizing computer systems such as those illustrated in FIGS. 1 and 2. Furthermore, bus bridge 12 may be implemented in more than one integrated circuit in order to support the number of ports desired in a given embodiment. Control signals between the integrated circuits may be used to coordinate activities among the integrated circuits.

In yet another embodiment, one or more circuits may be interposed between the processors and bus bridge 12 without departing from the spirit and scope of the present disclosure. Such circuits may perform an electrical conversion, a bus protocol conversion to a bus which may be more suitable for connection of a larger number of processors, etc.

The term "bus operation", as used herein, refers to a single operation defined by the bus protocol employed by CPU bus 34. The operation may include an address tenure in which the address, operation type (e.g. read, write, etc.), size, etc. is conveyed from the initiator of the operation to the receiver of the operation. Additionally, the operation may include a data tenure during which the data corresponding to the operation is conveyed. One particular type of bus operation is a snoop operation. The snoop operation is used for maintaining coherency, and includes information indicating the desired cache state within the receiver of the snoop operation requested by the initiator of the snoop operation and or a request to write an updated copy (if any) from the receiver of the snoop to main memory 14. A processor may initiate a snoop operation if the processor includes a copy of data to be manipulated within the processor's cache but the state of the copy precludes performance of the desired manipulation. Bus bridge 12 may generate the snoop operation in response to a bus operation received upon a different port. For example, if a processor within processor slot 160A initiates a read bus operation, bus bridge 12 may generate a snoop operation upon CPU buses 34a, 34b, and 34c to determine if one of the processors within processor slots 160B–160D is maintaining an updated copy of the requested data. If one of the processors is maintaining an updated copy of the requested data, bus bridge 12 may retrieve the data from that processor and transmit the data to the requesting processor. Main memory 14 may be updated as well. If none of the processors are maintaining an updated copy of the requested data, bus bridge 12 retrieves the data from main memory 14.

Employing configurations such as that shown in FIG. 3 in the computer systems illustrated in FIGS. 1 and 2 may allow for additional advantages to be enjoyed. For example, a computer system may be initially configured with one or more emulation coprocessors within processor slots 160A–160D. Subsequently, it may be determined that emulation coprocessor support is no longer needed because foreign application programs are no longer being executed upon the computer system (or alternatively, foreign application programs are infrequently being executed). Once coprocessor support is no longer needed, the emulation coprocessor(s) may be removed from the computer system and replaced by additional host processors. In this manner, the processing power available within the computer system for host application programs and operating system routines may be increased. In alternative configurations to the one shown in FIG. 3, emulation coprocessors may be physically dimensioned different from the host processors.

As used herein, the term "processor slot" is used to refer to a connector for inserting a processor. The connector may, for example, comprise a connector defined according to the Slot 1, Slot A, or Slot 2000 specifications. Alternatively, the connector may be compatible with, for example, the Socket 7 definition. Any suitable connector for inserting processors may be a "processor slots" as defined herein.

Figure 4:
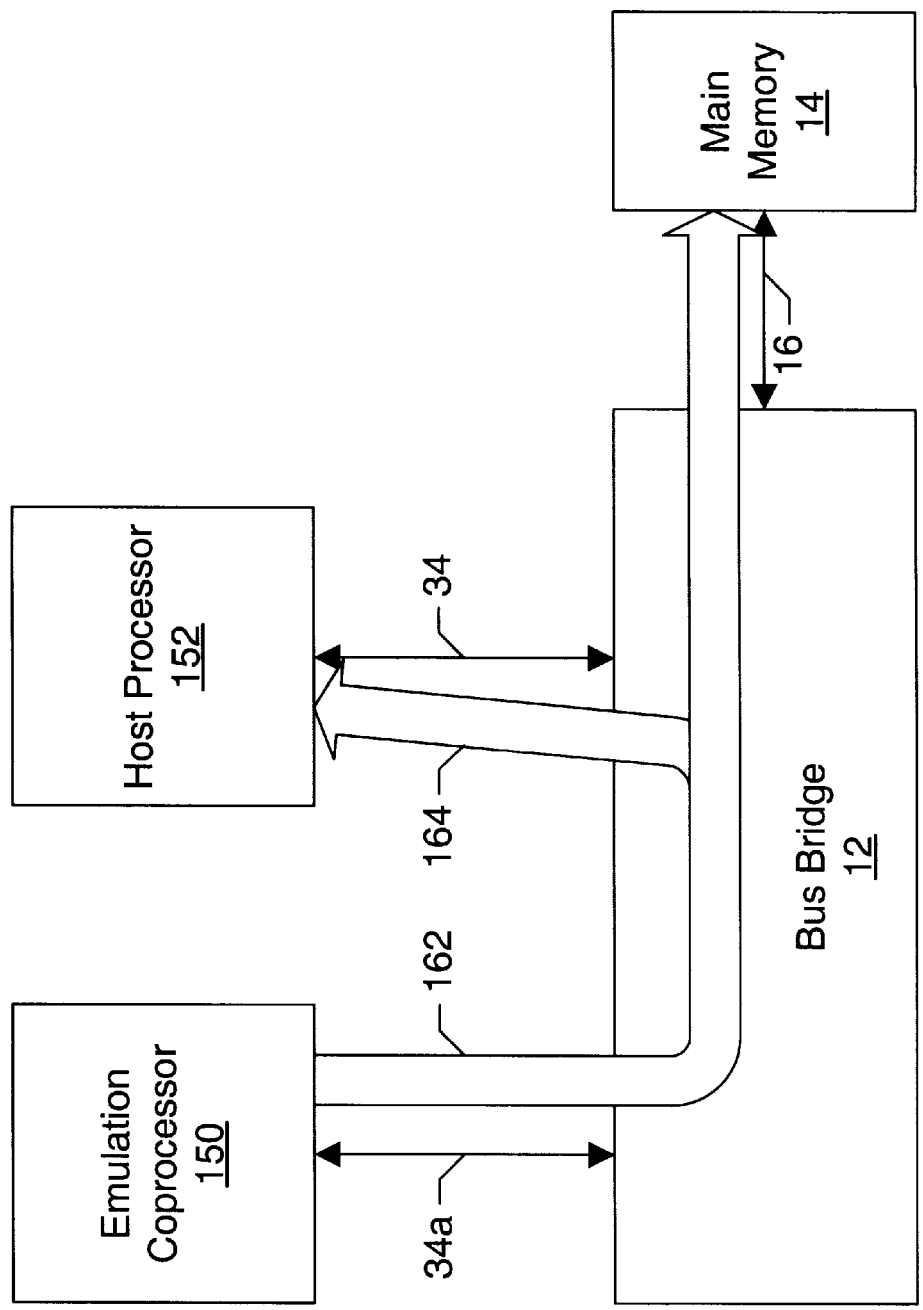
FIG. 4 is a block diagram illustrating performance of a bus operation in one embodiment of a bus bridge coupled to an emulation coprocessor, a host processor, and a memory.

Turning next to FIG. 4, a block diagram illustrating performance of a memory operation according to one embodiment of computer system 5 is shown. Other embodiments are possible and contemplated. In the illustrated embodiment, emulation coprocessor 150 is coupled to bus bridge 12 via CPU bus 34a and host processor 152 is coupled to bus bridge 12 via CPU bus 34. Main memory 14 is coupled to bus bridge 12 via memory bus 16.

Arrow 162 illustrates initiation of a memory operation (e.g. a read or write bus operation targeting main memory 14). Emulation coprocessor 150 transmits the memory operation upon CPU bus 34a to bus bridge 12. Bus bridge 12 decodes the memory operation and determines that main memory 14 is the target for the operation (as opposed to PCI bus 24 or AGP bus 20). Accordingly, bus bridge 12 routes the memory operation to main memory 14.

Bus bridge 12 also determines i f the memory operation is a coherent memory operation. Various factors may define the memory operation to be non-coherent. For example, if a memory operation is non-cacheable, it may be non-coherent. If the memory operation is coherent, bus bridge 12 may route a snoop operation those processor 152 via CPU bus 34 prior to routing the memory operation to main memory 14 (arrow 164). Based upon the response to the snoop operation by host processor 152, bus bridge 12 may or may not route the memory operation to main memory 14. If, for example, host processor 152 has the requested data in a dirty state (i.e. updated with respect to the data stored in main memory), the data may be read from processor 152 and provided to coprocessor 150 directly by bus bridge 12. Furthermore, if host processor 152 stores a copy of the data and emulation coprocessor 150 is updating main memory, bus bridge 12 may request that host processor 152 invalidate its copy.

Similar operations to those shown in FIG. 4 with respect to a memory operation initiated by emulation coprocessor 150 may be performed for a memory operation initiated by host processor 152. As mentioned above, bus bridge 12 is preferably not aware of whether or not a given processor is emulation coprocessor or a host processor. Instead, bus bridge 12 provides access to main memory 14 (and peripheral buses) and maintains coherency between processors connected to the various ports of bus bridge 12.

FIGS. 5 through 8 described below illustrate one embodiment of software control of emulation coprocessor 150 by host processor 152. Other embodiments are possible and contemplated. Any suitable software control method may be employed with the hardware described herein.

Figure 5:
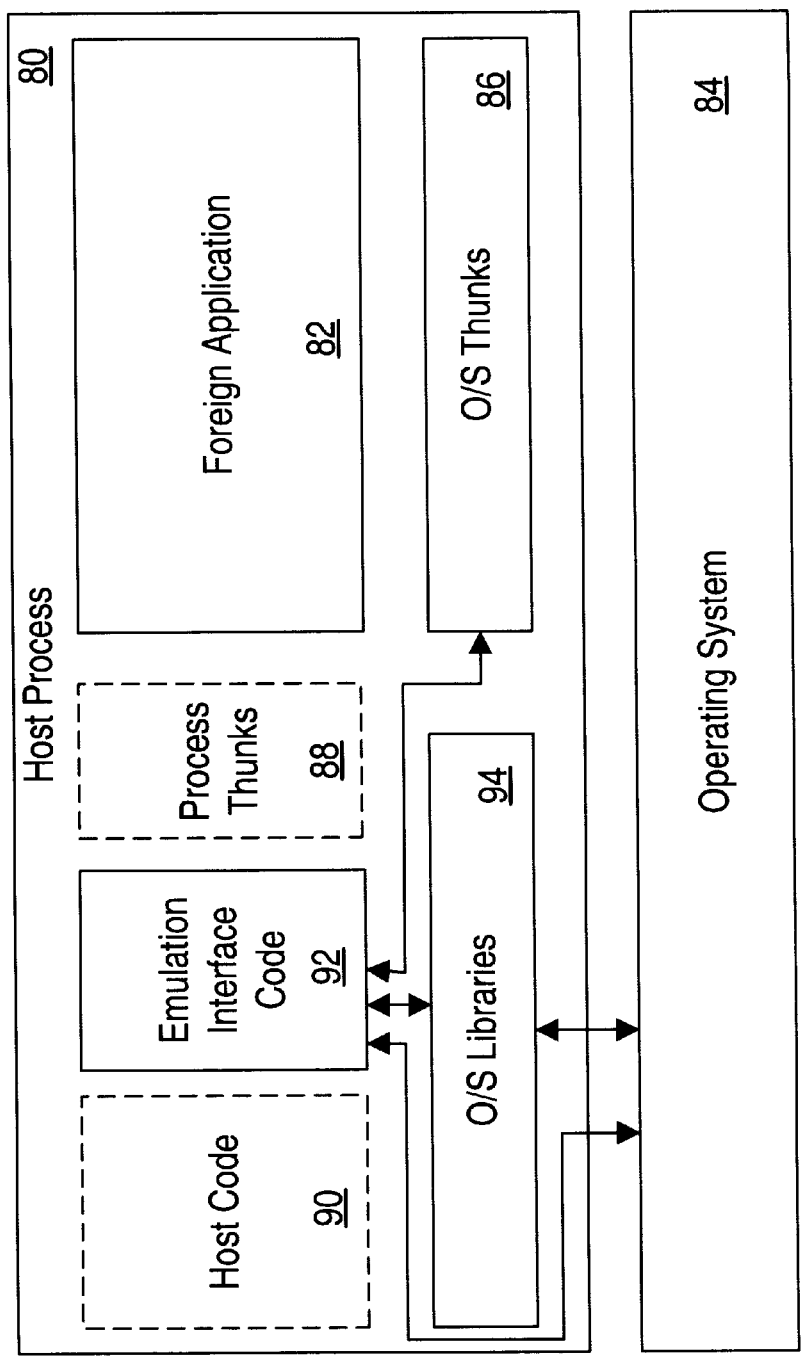
FIG. 5 is a diagram illustrating a process including a foreign application program and an operating system upon which the foreign application program executes.

Turning now to FIG. 5, a block diagram of a software model employed by one embodiment of computer system 5 is shown. FIG. 5 illustrates a host process 80 including a foreign application program 82. The embodiment shown may, for example, represent the operation of the Windows NT operating system with the Alpha instruction set architecture as the host instruction set architecture and the x86 instruction set architecture as the foreign instruction set architecture. FIG. 5 may further represent other operating systems, host instruction set architectures, and foreign instruction set architectures. Other embodiments are possible and contemplated.

Foreign application 82 comprises one or more modules coded in the foreign instruction set architecture. The foreign application may include calls to operating system routines. Instead of directly calling the operating system routines, each routine is replaced by a "thunk". The thunk is a routine having the same name as the routine which it replaces (and therefore the same address within the address space of process 80). In the present embodiment, the thunk includes a particular, predefined illegal opcode, which causes the emulation coprocessor to take an illegal opcode trap (or "exception"). Upon taking an illegal opcode trap, the emulation coprocessor communicates with the host processor to indicate that the foreign application has stopped. For example, the emulation coprocessor may include hardware which generates the stop message upon taking the illegal opcode trap. Alternatively, the illegal opcode trap handler (code stored at a predetermined address defined to be fetched upon the occurrence of the illegal opcode trap) may be coded to provide the stop message. Two sets of thunks are shown in FIG. 5, operating system thunks 86 and process thunks 88. Operating system thunks 86 are used to intercept operating system calls, both direct operating system calls coded into the foreign application program 82 and indirect operating system calls which occur as response to exceptions during execution of foreign application program 82. Additionally, process thunks 88 may be included for communicating with a block of host code 90 included in the process. However, process thunks 88 and host code 90 are optional. The aforementioned process can be used to detect the transitions between foreign application code and host code. Other embodiments may employ other methods for detecting the transition.

Host process 80 further includes emulation interface code 92 which may be used to communicate between the host processor and the emulation coprocessor. Accordingly, operating system thunks 86 may lead to invocation of emulation interface code 92 to pass messages between the host processor and emulation coprocessor. Furthermore, the host processor may be configured to request context information from the emulation coprocessor using emulation interface code 92. While the operating system routines being called by foreign application program 82 and corresponding operating system routines provided by operating system 84 provide the same function, the calling conventions (i.e. the manner in which parameters are passed between the application and the operating system routine) are different because the instruction set architectures are different. For example, the number and type of registers differ, and therefore the ability to pass parameters within the registers (as opposed to memory locations) differs. Accordingly, emulation interface code 92 may request the context values which are the parameters for the call, and may place the parameters in the corresponding registers on the host processor. The operating system call may then be performed by the host processor. Subsequently, the results of the operating system routine may be placed into the emulation coprocessor by reversing the conversion of calling conventions.

Still further, operating system library code 94 may be included in host process 80. For example, dynamic load libraries defined in the Windows NT operating system may be resolved via operating system libraries 94.

Figure 6:
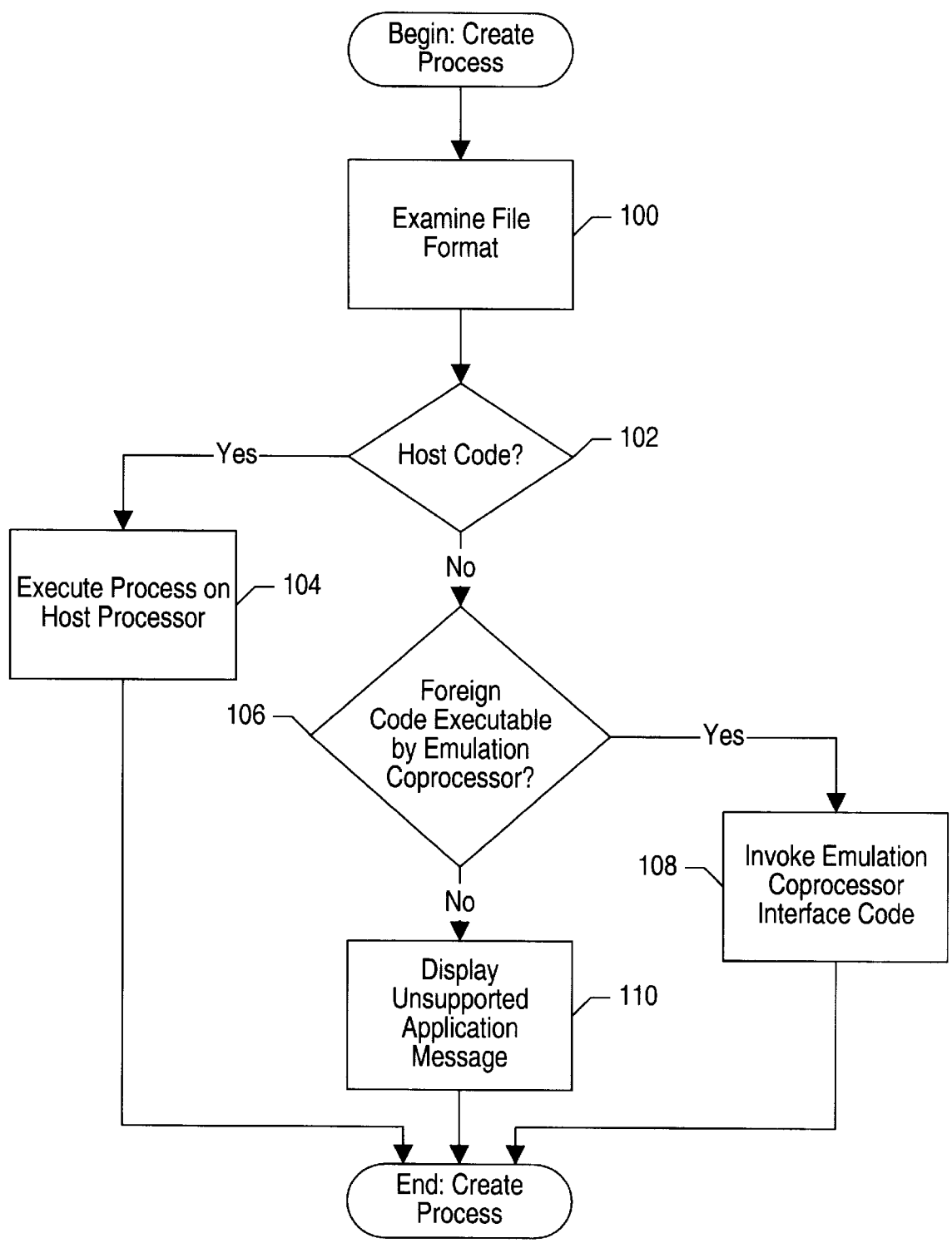
FIG. 6 is a flowchart illustrating initiation of a process according to one embodiment of an operating system.

Turning next to FIG. 6, a flowchart is shown illustrating initialization of an application program according to one embodiment of the computer system shown in FIG. 1. Other embodiments are possible and contemplated. While several steps may be shown in FIG. 6 in a serial order for ease of understanding, any suitable order may be used. Furthermore, steps may be performed in parallel as desired.

Upon receiving a command from a user to initiate an application program, the operating system creates a process in which the application program executes. The operating system examines the file format of the application program to determine what type of code is included in the application program (step 100). For an embodiment employing the Windows NT operating system, for example, the portable execution format includes an indication of which instruction set architecture the application program is coded for. The portable execution format is defined as part of an application programming interface defined by Windows NT.

If the application program is determined to be coded according to the host instruction set architecture (decision block 102), the operating system establishes the process as a normal host process and the application program is executed by the host processor (step 104). On the other hand, if the application program is determined not to be coded according to the host instruction set architecture, the operating system determines if the application program is coded according to a foreign instruction set architecture which is executable by an emulation coprocessor within the computer system (decision block 106). If the foreign instruction set architecture is executable by the emulation coprocessor, the operating system invokes the emulation coprocessor interface code in order to initiate the foreign application program upon the emulation coprocessor (step 108). If the foreign instruction set architecture is not executable by the emulation coprocessor, the operating system displays a message to the user indicating that the application is unsupported (step 110). The application program is not started in this case. Alternatively, software emulation or binary translation of the application may be provided at step 110 if desired. For example, a scheme similar to Digital Equipment Corporation's FX!32 product or Microsoft's Wx86 product may be employed.

Figure 7:
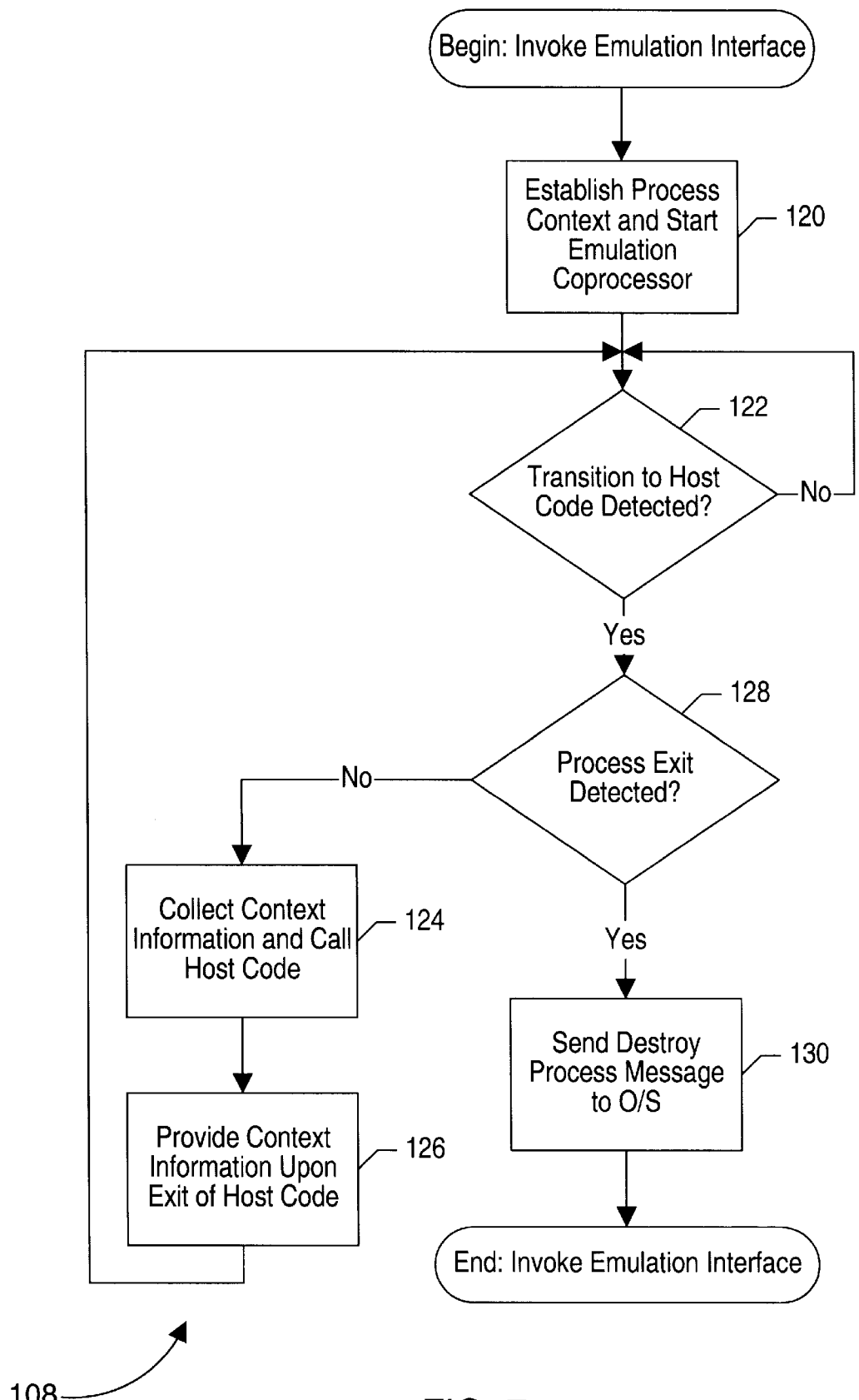
FIG. 7 is a flowchart illustrating one embodiment of invoking an emulation interface as shown in FIG. 6.

Turning next to FIG. 7, a flowchart is shown illustrating one embodiment of invocation of an emulation interface shown in FIG. 5 (e.g. step 108 shown in FIG. 6). Other embodiments are possible and contemplated. The process context is established by the host processor (using commands transmitted via the command interface between the host processor and the emulation coprocessor). Initial values for the registers are provided, including a value for the program counter register which is the virtual address of the first instruction in the application program. After establishing the context, the "go" (i.e. start executing) command is given to the emulation coprocessor (step 120).

The emulation interface code, executing upon the host processor, monitors command interface 54 to receive a message from the emulation coprocessor indicating that a transition to host code has been detected (i.e. a stop message is received from the emulation coprocessor). If a transition to host code is detected (decision block 122), the host processor determines if the transition is due to a process exit condition (decision block 128). As will be illustrated below in FIG. 8, the stop command may include an indication of the reason for stopping. If a process exit is detected, a destroy process message is sent to the operating system and the emulation interface code exits (step 130).

On the other hand, if a process exit is not detected, the host processor collects context information, via command interface 54, to determine which operating system routine is to be executed and what the calling parameters are (step 124). The host code is then executed upon the host processor. Context information is provided, via command interface 54, to the emulation coprocessor. Results provided via execution of the operating system routine may be passed, if applicable, to the emulation coprocessor in this fashion. The go command is then provided to cause the emulation coprocessor to continue (step 126), and the host processor continues to monitor for messages from the emulation coprocessor.

It is noted that there are at least two types of operating system routines which may be called by the foreign application program. The first type is an operating system library routine call intentionally coded into the foreign application program. Library routines provide low level services which may be used by many application programs, and are used by the application program instead of coding the service themselves. Typically, the library routines and parameters used by the routines are documented for the application developer's use. Additionally, operating system routines which provide exception handling may be called. As implied in the name, these routines are "called" when the emulation coprocessor detects an exception. For example, page faults occurring when an instruction fetch address or data address fails to translate invoke an exception routine to allocate a page.

Page faults may occur upon the initial access to a particular page. For example, when the emulation coprocessor attempts to fetch the first instruction of an application program, the page including the first instruction may not yet be allocated to the application program. Accordingly, the fetch address does not translate and a page fault occurs. Similarly, each time data is accessed from a new page, a page fault may occur. Page faults may also occur if the page is "paged out" to disk to allow a different page to be allocated.

It is noted that the flowchart of FIG. 7 may be interrupted under a preemptive multitasking operating system such as Windows NT to allow the host processor to execute other tasks (e.g. a host application program or an operating system routine unrelated to the application being executed). Furthermore, if multiple foreign applications are executing concurrently, multiple processes may be monitoring for messages.

In one embodiment, the emulation interface code may interface to the Wx86 extension to the Windows NT operation system.

Turning now to FIG. 8, a table 140 is shown illustrating the commands supported by one embodiment of command interface 54. Other embodiments employing different commands, or combinations of different commands and one or more commands shown in table 140, are contemplated.

A read registers command is supported for reading emulation coprocessor registers by the host processor. The emulation coprocessor responds to the read registers command by providing the requested register values. It is noted that memory values may be read from the emulation coprocessor's context as well. However, since the emulation coprocessor and the host processor share the same physical memory, the host processor may read the memory values directly. For example, translations may be created according to both the host processor's instruction set architecture and the emulation coprocessor's instruction set architecture for each page allocated to a foreign application program. Accordingly, the host processor may view memory allocated to the foreign application's context.

Similarly, a write registers command is supported to allow the host processor to update registers within the emulation coprocessor. The emulation coprocessor receives data provided in the write registers command and updates the specified register with the received value. Similar to the above comments regarding reading memory, the host processor may update memory in the emulation coprocessor's context as well.

The go command indicates to the emulation coprocessor that the emulation coprocessor should begin execution. Prior to sending the go command to the emulation coprocessor, an execution pointer is stored into the program counter register in the emulation coprocessor. The emulation coprocessor, upon receiving the go command, begins fetching and executing instructions at the execution pointer. Alternatively, the execution pointer may be communicated within the go command, if desired.

A stop command is transmitted by the emulation coprocessor upon determining that an architectural switch is to be performed due to the execution of the foreign application program (e.g. host code is to be executed). The stop command informs the host processor that the emulation coprocessor has stopped, and provides the reason for the stoppage as well. A variety of reasons for stoppage may be employed as desired. For example, reasons for stoppage may include: (i) executing a thunk (as described above) for an operating system call; (ii) detecting the end of execution of the foreign application program; or (iii) experiencing an exception during execution of the application program. If desired, using read registers commands and reading the foreign application program's memory, the host processor may collect additional context information.

It is noted that the term "messages" may be used herein to refer to communications between the host processor and the emulation coprocessor. It is intended that the term messages and commands be synonymous in this disclosure.

Figure 9:
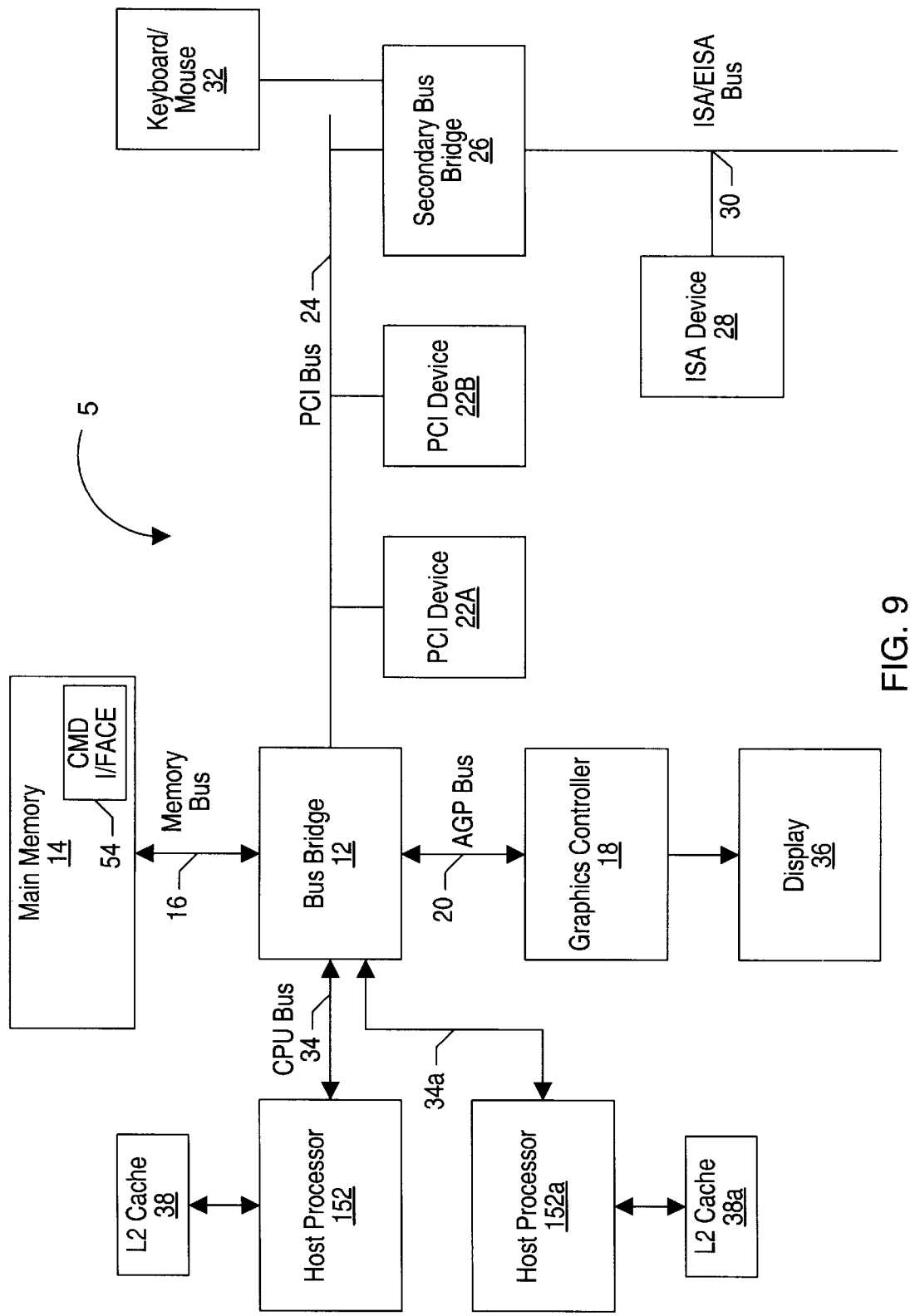
FIG. 9 is a block diagram of the computer system shown in FIG. 1 with the emulation coprocessor replaced by another host processor.

Turning now to FIG. 9, a block diagram of computer system 5 as shown in FIG. 1 is shown with emulation coprocessor 150 replaced by host processor 152a. In other words, host processor 152a is coupled to CPU bus 34a and L2 cache 38a. FIG. 9 illustrates an additional advantage which may be achieved by embodiments of computer system 5. Once execution to the foreign application programs is no longer desired within computer system 5, emulation coprocessor 150 may be replaced by host processor 152a.

Figure 10:
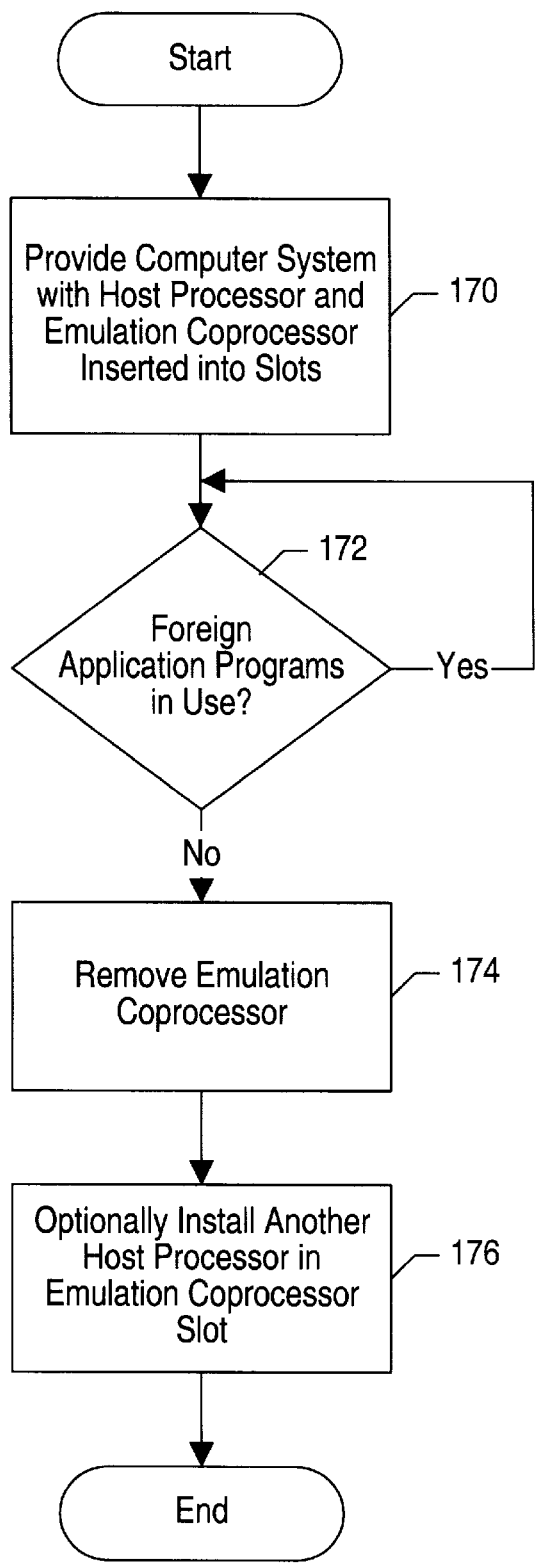
FIG. 10 is a flowchart illustrating the process of providing a computer system with an emulation coprocessor and replacing the emulation coprocessor with a host processor.

Turning next to FIG. 10, a flowchart is shown illustrating the method for using computer system 5 for providing foreign application execution support upon initial deployment of computer system 5, and for later removing the emulation coprocessor when foreign application execution is no longer desired. Other embodiments are possible and contemplated.

Initially, the computer system is provided including a host processor inserted into one of the processor slots and an emulation coprocessor inserted into another one of the processor slots (step 170). If more than two slots are provided, the remaining slots may be populated with host processors or emulation coprocessors as desired. The computer system configured as described in step 170 is deployed and provides foreign application execution support with high performance.

Subsequently, it may be determined that the foreign application programs are no longer in use upon the computer system (decision block 172). While foreign application program execution is still desired, computer system 5 may remain deployed as configured in step 170. However, once foreign application program execution is no longer desired, the emulation coprocessor may be removed from the system (step 174). Removing emulation coprocessor from the system may reduce power consumption even if installing a host processor in the emulation coprocessor slot is not desired. Furthermore, contention for memory by the emulation coprocessor may be eliminated. A single processor computer system may thereby be deployed, or a symmetric multi-processing system may be deployed, as desired.

A host processor may optionally be installed in place of the emulation coprocessor removed in step 174 (step 176). In this manner, additional host processor power may be employed in a computer system once emulation coprocessor is no longer desired.

It is noted that decision block 172 may be a threshold-type decision. Foreign application programs may still be in use upon computer system 5, but the frequency of use of the foreign application programs may diminish to the level where hardware execution support is no longer desired. The threshold level for the frequency of use of the application program may in part depend upon the additional host processing performance which may be achieved by replacing the emulation coprocessor with the host processor (if desired). Software emulation may remain upon the system for supporting foreign application program execution after the emulation coprocessor is removed.

In accordance with the above disclosure, a computer system has been described which provides high performance support for foreign application programs. An emulation coprocessor is included which is adapted for connection to a bus bridge which is also adapted for connection to host processors and a memory. The bus bridge provides direct, high performance access of the emulation coprocessor to memory and coherency with the host processor. Advantageously, high performance execution of the foreign applications programs may be provided.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a first processor configured to execute first instructions defined by a first instruction set architecture;
    a second processor configured to execute second instructions defined by a second instruction set architecture different from said first instruction set architecture;
    a memory; and
    a bus bridge coupled to said first processor, said second processor, and said memory, wherein said bus bridge is configured to provide access to said memory by said first processor and said second processor, and wherein said bus bridge, said first processor, and said second processor are configured to participate in maintaining coherency between said first processor, said second processor, and said memory.

2. The computer system as recited in claim 1 wherein said first processor is electrically and logically adapted to connect to a first bus.

3. The computer system as recited in claim 2 wherein said second processor is electrically and logically adapted to connect to said first bus.

4. The computer system as recited in claim 3 wherein said bus bridge includes at least two ports, each employing electrical and logical characteristics of said first bus, and wherein said first processor is coupled to a first port of said at least two ports, and wherein said second processor is coupled to a second port of said at least two ports.

5. The computer system as recited in claim 4 wherein said bus bridge is configured to maintain coherency by routing a snoop corresponding to an operation received upon one of said at least two ports to remaining ones of said at least two ports.

6. The computer system as recited in claim 1 wherein said bus bridge is coupled to a peripheral bus, and wherein said bus bridge is configured to provide access to said memory by devices coupled to said peripheral bus.

7. The computer system as recited in claim 6 wherein said peripheral bus comprises a peripheral component interconnect (PCI) bus.

8. The computer system as recited in claim 6 wherein one of said devices coupled to said peripheral bus comprises a communication device configured to communicate between said computer system and another computer system to which said communication device is coupled.

9. A method for providing execution capability in a computer system, the method comprising:
    inserting a first processor configured to execute first instructions defined by a first instruction set architecture into one of at least two electrically and logically identical processor slots of a computer system; and
    inserting, into another one of said at least two processor slots, a second processor configured to execute second instructions defined by a second instruction set architecture different than said first instruction set architecture.

10. The method as recited in claim 9 further comprising operating said second processor as a coprocessor to execute application programs coded using said second instructions, wherein an operating system for said computers system is coded using said first instructions.

11. The method as recited in claim 9 further comprising determining that execution of application programs coded using said second instructions has ceased.

12. The method as recited in claim 11 further comprising removing said second processor from said another one of said at least two processor slots responsive to said determining.

13. The method as recited in claim 12 further comprising inserting a third processor configured to execute said first instructions defined by said first instruction set architecture into said another one of said at least two processor slots.

14. The method as recited in claim 9 wherein said computer system comprises a bus bridge coupled to said at least two processor slots and to a memory, wherein said bus bridge is configured to provide access to said memory by processors inserted into said at least two processor slots.

15. The method as recited in claim 9 further comprising maintaining coherency between said first processor and said second processor by routing a snoop corresponding to an operation received from one of said at least two processor slots to remaining ones of said at least two processor slots.

* * * * *